(12) United States Patent
Jiang et al.

(10) Patent No.: US 12,057,595 B2
(45) Date of Patent: Aug. 6, 2024

(54) BOX, BATTERY PACK, AND DEVICE

(71) Applicant: Jiangsu Contemporary Amperex Technology Limited, Jiangsu (CN)

(72) Inventors: Liwen Jiang, Jiangsu (CN); Jinmei Xu, Jiangsu (CN); Wumei Fang, Jiangsu (CN)

(73) Assignee: Jiangsu Contemporary Amperex Technology Limited, Changzhou (CN)

( * ) Notice: Subject to any disclaimer, the term of this patent is extended or adjusted under 35 U.S.C. 154(b) by 271 days.

(21) Appl. No.: 17/715,079

(22) Filed: Apr. 7, 2022

(65) Prior Publication Data
US 2022/0231371 A1     Jul. 21, 2022

Related U.S. Application Data

(63) Continuation of application No. PCT/CN2020/139626, filed on Dec. 25, 2020.

(30) Foreign Application Priority Data

Mar. 31, 2020 (CN) .......................... 202010244822.X

(51) Int. Cl.
*H01M 50/242* (2021.01)
*H01M 50/209* (2021.01)
*H01M 50/249* (2021.01)

(52) U.S. Cl.
CPC ....... *H01M 50/242* (2021.01); *H01M 50/209* (2021.01); *H01M 50/249* (2021.01); *H01M 2220/20* (2013.01)

(58) Field of Classification Search
CPC ............. H01M 50/242; H01M 50/209; H01M 50/249; H01M 2220/20
See application file for complete search history.

(56) References Cited

U.S. PATENT DOCUMENTS

| 2017/0305249 | A1* | 10/2017 | Hara | ............... | B62D 25/2036 |
| 2019/0393459 | A1 | 12/2019 | Wesche et al. | | |
| 2020/0365850 | A1* | 11/2020 | Shinoda | ............ | H01M 10/6567 |

FOREIGN PATENT DOCUMENTS

| CN | 101389501 A | 3/2009 |
| CN | 201769670 U | 3/2011 |

(Continued)

OTHER PUBLICATIONS

PCT International Search Report for PCT/CN2020/139626, dated Mar. 26, 2021, 10 pages.

(Continued)

*Primary Examiner* — Christopher P Domone
(74) *Attorney, Agent, or Firm* — East IP P.C.

(57) ABSTRACT

Embodiments of this application provide a box, a battery pack, and a device, and relate to the technical field of energy storage devices. The box includes a frame member, a fixing member, and a shielding member. The frame member is configured to form an accommodation cavity. The fixing member is configured to mount the box. The fixing member is connected to the frame member. The shielding member is configured to be connected to the frame member. The shielding member includes a hollow portion. At least a part of the fixing member is accommodated in the hollow portion. The battery pack includes the box and a battery accommodated in the accommodation cavity of the box. The device includes the battery pack, and the battery pack is configured to provide electrical energy.

14 Claims, 4 Drawing Sheets

(56) References Cited

FOREIGN PATENT DOCUMENTS

| | | | |
|---|---|---|---|
| CN | 102770331 | A | 11/2012 |
| CN | 107364325 | A | 11/2017 |
| CN | 107379949 | A | 11/2017 |
| CN | 208336326 | U | 1/2019 |
| CN | 111129392 | A | 5/2020 |
| DE | 1020122 13308 | A1 | 9/2013 |
| JP | 2017193 288 | A | 10/2017 |
| JP | 2017193289 | A | 10/2017 |
| JP | 2017196952 | A | 11/2017 |
| JP | 2018131 133 | A | 8/2018 |
| WO | 2022101221 | A1 | 5/2022 |

OTHER PUBLICATIONS

The First Office Action for Chinese Application No. 202010244822. X, dated May 13, 2020, 12 pages.
The Second Office Action for Chinese Application No. 202010244822. X, dated Jun. 5, 2020, 7 pages.
The First Office Action for JP Application No. 2022-540861, dated Jul. 31, 2023, 10 pages.
The extended European search report for European Application No. 20929153.3, dated Nov. 24, 2023, 7 pages.

\* cited by examiner

BOX, BATTERY PACK, AND DEVICE

CROSS-REFERENCE TO RELATED APPLICATIONS

This application is a continuation of International Application No. PCT/CN2020/139626, filed on Dec. 25, 2020, which claims priority to Chinese Patent Application No. 202010244822.X, filed on Mar. 31, 2020, both of which are hereby incorporated by reference in their entireties.

TECHNICAL FIELD

This application relates to the technical field of batteries, and in particular, to a box, a battery pack, and a device.

BACKGROUND

The market demand for new energy vehicles has spurred vigorous development of the new energy vehicles. High reliability of design needs to be ensured in the structural design of a battery pack. Generally, a hitch part of the battery pack is a boundary of the battery pack. The hitch part safeguards performance and integrity of the battery pack, and is essential to safety of a vehicle. However, in the related art, the hitch part of the battery pack is exposed to the outside of the battery pack. Therefore, when the vehicle loses control or collides, the hitch part is most vulnerable to failure. Consequently, the battery pack is squeezed, and safety performance of the battery pack and the vehicle is inferior.

SUMMARY

This application provides a box, a battery pack, and a device to mitigate the problem that a hitch part of the battery pack is vulnerable to failure when a vehicle collides.

A first aspect of the embodiments of this application provides a box. The box includes:

- a frame member, configured to form an accommodation cavity;
- a fixing member, configured to mount the box, where the fixing member is connected to the frame member; and
- a shielding member, configured to be connected to the frame member, where the shielding member includes a hollow portion, and at least a part of the fixing member is accommodated in the hollow portion.

The shielding member includes a first shielding member and a second shielding member. The first shielding member and the second shielding member are connected to each other to form the hollow portion.

Because the shielding member with a hollow portion is disposed, even if a vehicle is squeezed in a lateral collision, the shielding member is squeezed first, and the shielding member withstands a squeezing force. In addition, the hollow portion disposed in the shielding member serves functions of absorbing and cushioning the squeezing force in the lateral collision, thereby increasing the capability of resisting the squeezing force in the lateral collision and effectively safeguarding the performance and soundness of the battery pack. This mitigates the problem that a hitch part of the battery pack is vulnerable to failure when a vehicle collides, and improves safety performance of the battery pack and the vehicle.

In addition, the first shielding member and the second shielding member are disposed separately, so as to achieve the advantage of high strength in comparison with the integrally formed shielding member. The first shielding member and the second shielding member are disposed independently, and a joint between the first shielding member and the second shielding member can withstand a relatively high extrusion force, thereby significantly improving the capability of the shielding member to resist the squeezing force in a lateral collision.

In some embodiments, the fixing member is connected to a periphery of the frame member.

The fixing member is connected to the periphery of the frame member. The shielding member is configured to be connected to the frame member. The hollow portion contained in the shielding member accommodates at least a part of the fixing member. In this way, both the fixing member and the shielding member are connected to the periphery of the frame member. Therefore, even if a vehicle is squeezed in a lateral collision, the shielding member is squeezed firstly, and the shielding member withstands a squeezing force. In addition, the hollow portion disposed in the shielding member serves functions of absorbing and cushioning the squeezing force in the lateral collision, thereby increasing the capability of resisting the squeezing force in the lateral collision and effectively safeguarding the performance and soundness of the battery pack.

In some embodiments, the first shielding member includes a first bulge. The first bulge is disposed to protrude away from the second shielding member. The first bulge and a corresponding part of the second shielding member form the hollow portion.

In this embodiment, the first bulge is disposed to protrude away from the second shielding member to facilitate formation of the hollow portion configured to accommodate the fixing member. In addition, the first bulge can increase strength of the first shielding member, thereby increasing the strength of the entire shielding member, improving the capability of resisting a squeezing force in a lateral collision, and effectively safeguarding the performance and soundness of the battery pack.

In some embodiments, the second shielding member includes a second bulge, and the second bulge is disposed to protrude toward the first shielding member.

In this embodiment, the provision of the second bulge can increase the strength of the second shielding member, thereby increasing the strength of the entire shielding member. In addition, the second bulge is disposed to protrude toward the first shielding member, thereby downsizing the entire shielding member and downsizing the entire battery pack.

In some embodiments, the second bulge fits snugly with the first shielding member.

In this embodiment, the second bulge fits snugly with the first shielding member, thereby increasing the strength of the close-fitting position. After being squeezed in a lateral collision, the shielding member at the close-fitting position is not likely to deform, thereby improving the capability of resisting a squeezing force in a lateral collision and safeguarding the safety performance of the battery pack.

In some embodiments, the fixing member includes a hitch portion configured to fix the box, and the hitch portion is accommodated in the hollow portion.

The hitch portion in this embodiment is configured to hitch the box onto the vehicle. The hitch portion is accommodated in the hollow portion. When a squeeze in a lateral collision occurs, the hollow portion can serve a cushioning function and avoid the hitch portion to collide directly, thereby improving the capability of the battery pack to resist the squeezing force in a lateral collision.

In some embodiments, a top of the hitch portion fits snugly with the shielding member; and/or a bottom of the hitch portion fits snugly with the shielding member.

In this embodiment, the top or bottom of the hitch portion fits snugly with the shielding member to serve a function of supporting the hollow portion.

Alternatively, both the top and bottom of the hitch portion fit snugly with the shielding member. The hitch portion is located in the hollow portion. Therefore, the hitch portion and the shielding member fit snugly together to serve a function of supporting the hollow portion, and increase the strength of the shielding member.

The hitch portion includes a third bulge. The third bulge is disposed to protrude toward the first shielding member. A gap exists between the third bulge and the first shielding member.

In this embodiment, the provision of the third bulge can increase the strength of the hitch portion. A protrusion direction of the third bulge is consistent with a protrusion direction of the first bulge, thereby leaving the space for the shielding member.

A gap exists between the third bulge and the first shielding member. The gap is configured to install a bushing.

A second aspect of the embodiments of this application provides a battery pack. The battery pack includes: the box; and a battery accommodated in an accommodation cavity of the box.

The battery pack in this embodiment includes the box, thereby effectively safeguarding the performance and soundness of the battery pack, mitigating the problem that a hitch part of the battery pack is vulnerable to failure when a vehicle collides, and improving safety performance of the battery pack and the vehicle.

A third aspect of the embodiments of this application provides a device. The device includes the battery pack configured to provide electrical energy.

The device in this embodiment adopts the battery pack described above, thereby effectively safeguarding the performance and soundness of the battery pack, mitigating the problem that the hitch part of the battery pack is vulnerable to failure when the vehicle collides, and improving the safety performance of the battery pack and the vehicle.

BRIEF DESCRIPTION OF DRAWINGS

To describe the technical solutions in the embodiments of this application more clearly, the following outlines the drawings used in the embodiments of this application. Evidently, the drawings outlined below are merely a part of embodiments of this application. A person of ordinary skill in the art may derive other drawings from the outlined drawings without making any creative efforts.

Figure 1:
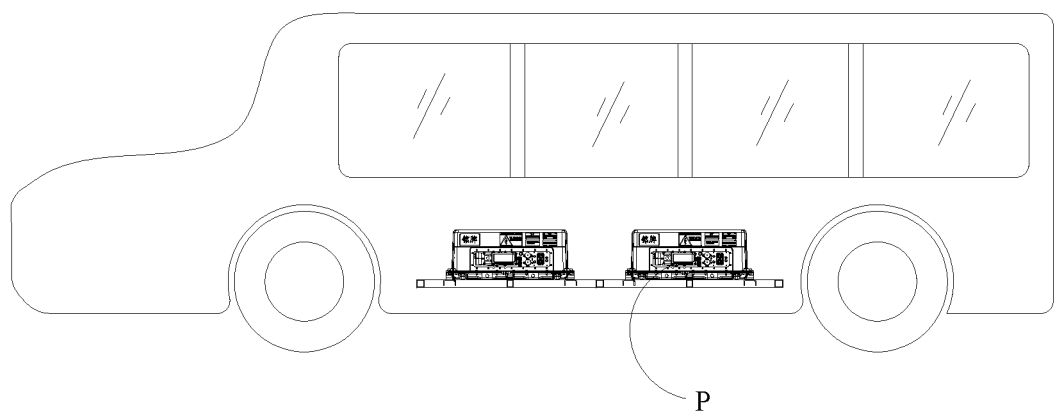
FIG. 1 is a schematic structural diagram of a device according to an embodiment of this application.

The drawings are not drawn to scale.

REFERENCE NUMERALS

P—Battery pack;
L—Battery module;
M—Box;
1—Frame member;
11—Accommodation cavity;
12—Reinforcing plate;
13—Crossbeam;
14—Vertical beam;
2—Shielding member;
21—First shielding member;
211—First bulge;
211a—First through hole;
212—Fourth bulge;
213—First connecting piece;
22—Second shielding member;
221—Beam body;
222—Second bulge;
222a—Main body;
222b—Extension portion;
223—Second through hole;
224—Second connecting piece;
23—Hollow portion;
3—Fixing member;
31—Hitch portion;
311—Third bulge; and
312—Third through hole.

DETAILED DESCRIPTION OF EMBODIMENTS

The following gives a more detailed description of implementations of this application with reference to accompanying drawings and embodiments. The detailed description of the following embodiments and the accompanying drawings are intended to exemplarily describe the principles of this application, but not to limit the scope of this application. Therefore, this application is not limited to the described embodiments.

In the description of this application, unless otherwise specified, "a plurality of" means two or more; the terms such as "upper", "lower", "left", "right", "inner", and "outer" indicating a direction or a position relationship are merely intended for ease or brevity of description of this application, but do not indicate or imply that the device or component referred to must be located in the specified direction or constructed or operated in the specified direction. Therefore, such terms shall not be understood as a limitation on this application. In addition, the terms "first", "second", and "third" are merely intended for descriptive purposes, but are not intended to indicate or imply relative importance. "Perpendicular" is not exactly perpendicular, but within an error tolerance range. "Parallel" is not exactly parallel, but within an error tolerance range.

The directional terms appearing in the following description indicate the directions shown in the drawings, but are not intended to limit specific structures in this application. In the context of this application, unless otherwise expressly specified, the terms "mount", "concatenate", and "connect" are understood in a broad sense. For example, a "connection" may be a fixed connection, a detachable connection, or an integrated connection, and may be a direct connection or an indirect connection implemented through an intermediary. A person of ordinary skill in the art can understand the specific meanings of the terms in this application according to specific situations.

Below, in a specific embodiment, this application is described further in detail with reference to specific embodiments in connection with the accompanying drawings.

Figure 2:
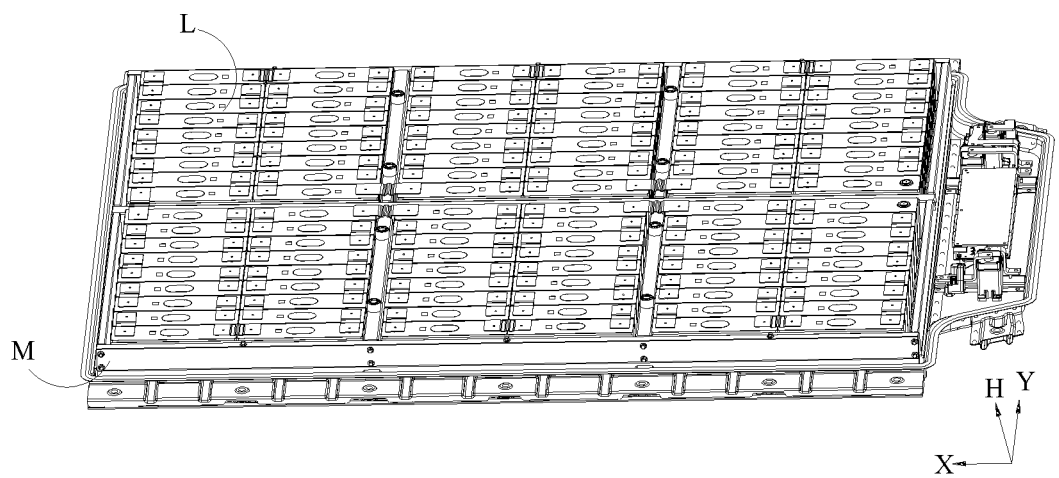
FIG. 2 is a schematic structural diagram of a battery pack according to an embodiment of this application.

FIG. 1 is a schematic structural diagram of a device according to an embodiment of this application; and FIG. 2 is a schematic structural diagram of a battery pack P according to an embodiment of this application. As shown in FIG. 1 and FIG. 2, an embodiment of this application provides a device. The device may be a mobile device such as a vehicle, an energy storage cabinet, a ship, or a small aircraft. The device includes a power source, and the power source is configured to provide a driving force for the device. The driving force of the device may be sole electrical energy, or may include electrical energy and other types of energy (such as mechanical energy). The power source may be a battery module L (or a battery pack P), or may be a combination of a battery module L (or battery pack P) and an engine, or the like. Therefore, all devices powered by a battery module L (or battery pack P) fall within the protection scope of this application.

By taking a vehicle as an example, a vehicle according to an embodiment of this application may be a new energy vehicle. The new energy vehicle may be a battery electric vehicle, or may be a hybrid electric vehicle, a range-extended electric vehicle, or the like. The vehicle may include a battery pack P and a vehicle body. The battery pack P is disposed in the vehicle body. A driving motor is further disposed in the vehicle body, and the driving motor is electrically connected to the battery pack P The battery pack P provides electrical energy. The driving motor is connected to wheels of the vehicle body through a transmission mechanism to drive the vehicle to move. Specifically, the battery pack P may be horizontally disposed at a bottom of the vehicle body.

As shown in FIG. 2, a battery pack P according to this embodiment includes a box M and a battery module L disposed in the box M. The battery module L includes a plurality of batteries. The batteries may be rechargeable secondary batteries. The plurality of batteries are located in an inner cavity of the box M and stacked together in the inner cavity along a length direction, a width direction or a height direction.

Each of the batteries includes an electrode assembly, a cap assembly, and a housing. The housing may be hexahedral or other shapes. A cavity is formed inside the housing to accommodate the electrode assembly and an electrolytic solution. The electrode assembly is formed by winding or stacking a positive electrode plate, a negative electrode plate, and a separator. One end of the housing opens so that the electrode assembly can be placed into the cavity of the housing through the opening. A plurality of electrode assemblies may be disposed in the cavity. The plurality of electrode assemblies are stacked together. The housing may include a metal material, such as aluminum or an aluminum alloy, or may include an insulation material such as plastic.

In a possible design, the box M is a structure the top of which opens, and includes an upper box cover. The size of the upper box cover is equivalent to the size of the opening at the top of the box M. The upper box cover may be fixed to the opening by a fastener such as a bolt. In addition, in order to improve airtightness of the box M, a sealing element may be disposed between the upper box cover and the box M.

The box M may be made of aluminum, aluminum alloy or other metal materials. The box M contains an accommodation cavity 11. The accommodation cavity 11 can accommodate a plurality of batteries. The plurality of batteries may form battery modules L. The battery modules L may be arranged alongside along a length direction (X) of the battery pack P in the box M, or may be arranged alongside along a width direction (Y) of the battery pack P Each battery module L is fixed to the box M.

In the related art, a hitch part of the battery pack P is a boundary of the battery pack P, and is most vulnerable to failure when a vehicle collides. The hitch part is exposed to the outside of the battery pack P and is not protected due to lack of a shielding structure. Therefore, when the vehicle loses control or collides, the hitch part is most prone to deform by a collision. In addition, the collision squeezes the box M and further squeezes the battery module L, thereby causing danger and impairing safety performance.

Figure 3:
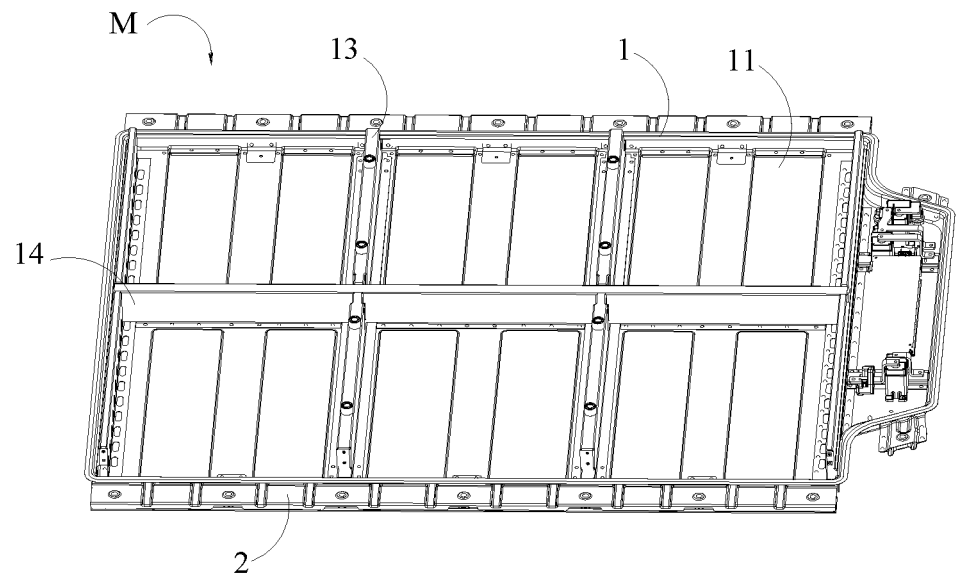
FIG. 3 is a schematic structural diagram of a box according to an embodiment of this application.
Figure 4:
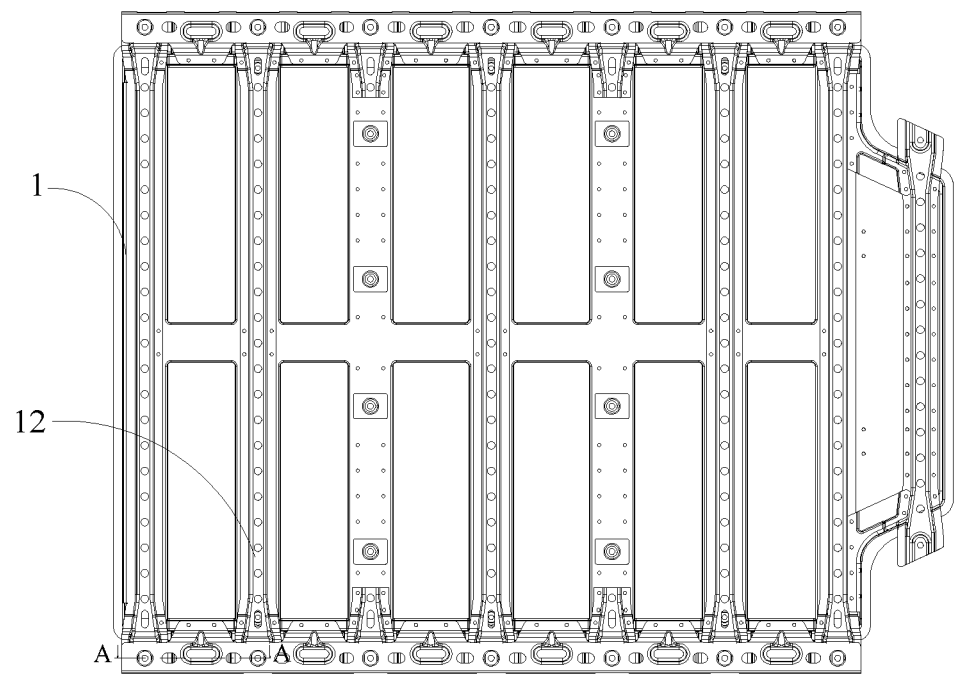
FIG. 4 is a bottom view of a box according to an embodiment of this application.
Figure 5:
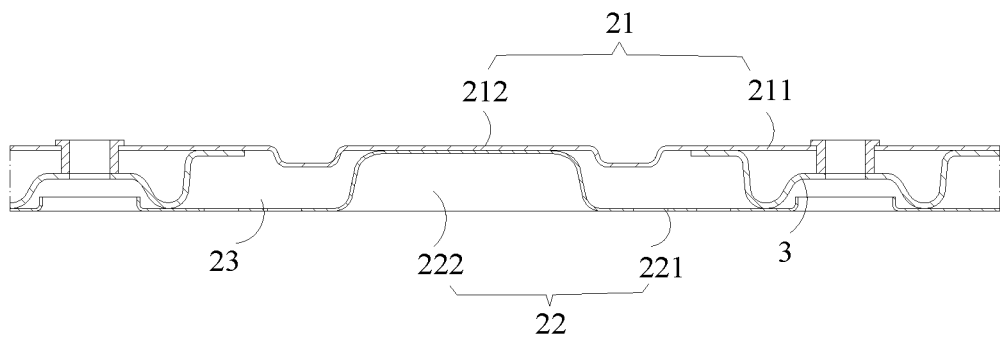
FIG. 5 is a sectional view of FIG. 4 sectioned along an A-A line.

FIG. 3 is a schematic structural diagram of a box M according to an embodiment of this application; FIG. 4 is a bottom view of a box M according to an embodiment of this application; and FIG. 5 is a sectional view of FIG. 4 sectioned along an A-A line. As shown in FIG. 3 to FIG. 5, this embodiment provides a box M for a battery pack P The box M includes a frame member 1, a fixing member 3, and a shielding member 2. The frame member 1 is configured to form an accommodation cavity 11. The fixing member 3 is configured to mount the box M. The fixing member 3 is connected to the frame member 1. The shielding member 2 is configured to be connected to the frame member 1. The shielding member 2 includes a hollow portion 23. At least a part of the fixing member 3 is accommodated in the hollow portion 23. The provision of the shielding member 2 with a hollow portion 23 mitigates the problem that a hitch part of the battery pack P is vulnerable to failure when a vehicle collides, and improves safety performance of the battery pack P and the vehicle.

The fixing member 3 is configured to hitch the frame member 1 onto the vehicle to form a hitch part of the battery pack P. When the vehicle is squeezed in a lateral collision, the fixing member 3 is squeezed, and then the frame member 1 and the battery module L are squeezed. Therefore, the shielding member 2 with a hollow portion 23 is disposed. The hollow portion 23 of the shielding member 2 accommodates at least a part of the fixing member 3 to protect the fixing member 3. Therefore, when the vehicle is squeezed in a lateral collision, the shielding member 2 is squeezed first, and the shielding member 2 withstands a squeezing force. In addition, the hollow portion 23 disposed in the shielding member 2 serves functions of absorbing and cushioning the squeezing force, thereby increasing the capability of resisting the squeezing force in the lateral collision and effectively safeguarding the performance and soundness of the battery pack P and improving safety performance of the vehicle.

Along a height direction (H) of the box M, a reinforcing plate 12 is disposed at the bottom of the frame member 1, and is configured to support the battery module L and serve a function of reinforcement. In addition, the fixing member 3 is a structure formed by extending the reinforcing plate 12 along the width direction (Y) of the box M. When the vehicle is squeezed in a lateral collision, the shielding member 2 is squeezed, and the fixing member 3 is also squeezed. However, the fixing member 3 transmits the force onto the reinforcing plate 12 to relieve the squeezing force imposed by the frame member 1 on the battery module L, thereby improving the safety performance of the battery pack P.

In a possible design, the box M includes a crossbeam 13 and a vertical beam 14. The crossbeam 13 and the vertical beam 14 partition the frame member 1 into a plurality of accommodation cavities 11. Each of the accommodation cavities 11 can accommodate the battery module L. In addition, the crossbeam 13 and the vertical beam 14 are fixedly connected to the battery module L separately, so that the battery module L is fixed in the accommodation cavity 11 of the box M to prevent the battery module L from loosening.

Figure 8:
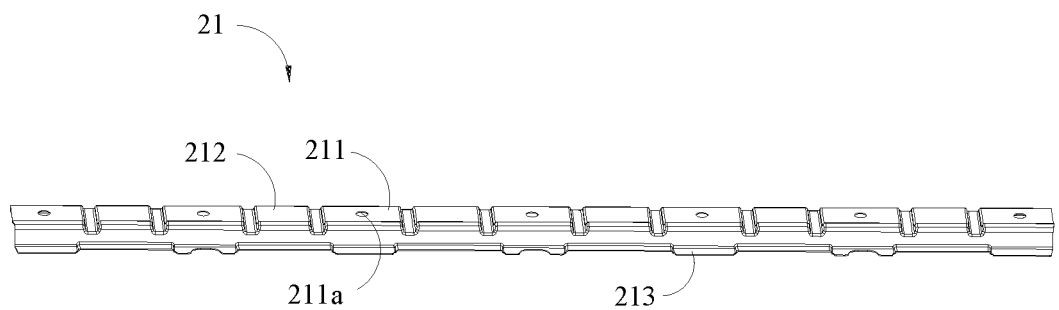
FIG. 8 is a top view of a first shielding member of a box according to an embodiment of this application.
Figure 9:
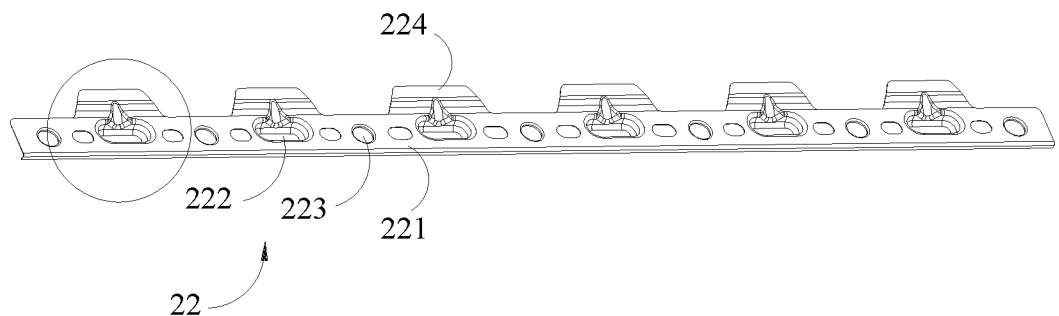
FIG. 9 is a bottom view of a second shielding member of a box according to an embodiment of this application.
Figure 10:
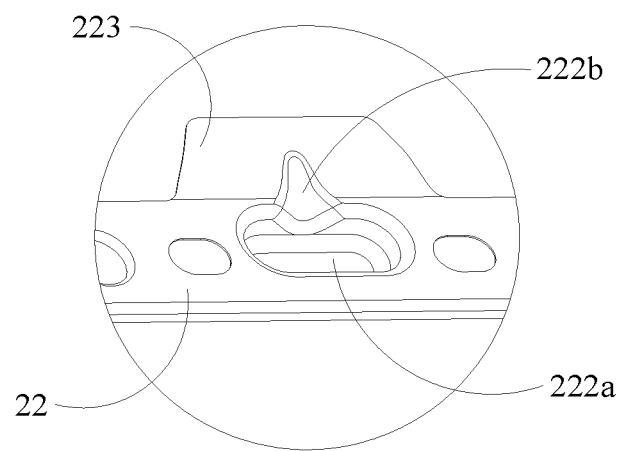
FIG. 10 is a local detailed view of a part of FIG. 9.

FIG. 8 is a top view of a first shielding member 21 of a box M according to an embodiment of this application; FIG. 9 is a bottom view of a second shielding member 22 of a box M according to an embodiment of this application; and FIG. 10 is a local detailed view of a part of FIG. 9. As shown in FIG. 8 to FIG. 10, the shielding member 2 according to this embodiment of this application includes a first shielding member 21 and a second shielding member 22. The first shielding member 21 and the second shielding member 22 are connected to each other to form a hollow portion 23. Along the height direction (H) of the box M, the first shielding member 21 and the second shielding member 22 are arranged from top downward to form a hollow portion 23 configured to accommodate the fixing member 3. The first shielding member 21 and the second shielding member 22 are disposed separately, so as to achieve the advantage of high strength in comparison with the integrally formed shielding member 2. The first shielding member 21 and the second shielding member 22 are disposed independently, and a joint between the first shielding member 21 and the second shielding member 22 can withstand a relatively high extrusion force, thereby significantly improving the capability of the shielding member 2 to resist the squeezing force in a lateral collision.

The first shielding member 21 includes a first connecting piece 213, and the second shielding member 22 includes a second connecting piece 224. The first connecting piece 213 is connected to the second connecting piece 224 to form the shielding member 2. The two connecting pieces can improve the capability of the shielding member 2 to withstand a squeezing force. In addition, the first connecting piece 213 and the second connecting piece 224 are fixedly connected to the frame member 1 separately to fix the first shielding member 21 and the second shielding member 22 onto the box M respectively, thereby improving the structural strength.

In a possible design, the first shielding member 21 includes a first bulge 211. The first bulge 211 is disposed to protrude away from the second shielding member 22. The first bulge 211 and a corresponding part of the second shielding member 22 form a hollow portion 23. The first bulge 211 is disposed to protrude away from the second shielding member 22 to facilitate formation of the hollow portion 23 configured to accommodate the fixing member 3. In addition, the first bulge 211 can increase strength of the first shielding member 21, thereby increasing the strength of the entire shielding member 2, improving the capability of resisting a squeezing force in a lateral collision, and effectively safeguarding the performance and soundness of the battery pack P.

Specifically, the second shielding member 22 includes a second bulge 222. The second bulge 222 is disposed to protrude toward the first shielding member 21. The second bulge 222 can increase the strength of the second shielding member 22, thereby increasing the strength of the entire shielding member 2. In addition, the second bulge 222 is disposed to protrude toward the first shielding member 21, thereby downsizing the entire shielding member 2 and downsizing the entire battery pack P.

Further, the second bulge 222 fits snugly with the first shielding member 21, thereby increasing the strength of the close-fitting position. After being squeezed in a lateral collision, the shielding member 2 at the close-fitting position is not likely to deform, thereby improving the capability of resisting a squeezing force in a lateral collision and safeguarding the safety performance of the battery pack P.

As shown in FIG. 10, the second bulge 222 includes a main body 222a and an extension portion 222b. The main body 222a and the extension portion 222b are connected in communication with each other. The main body 222a extends along the length direction (X) of the box M. The extension portion 222b extends along the width direction (Y) of the box M. The extension portion 222b can enhance effects of the shielding member 2 in absorbing and cushioning a squeezing force, thereby improving the capability of resisting the squeezing force in a lateral collision.

As shown in FIG. 5, the second shielding member 22 further includes a beam body 221. The beam body 221 is disposed corresponding to the first bulge 211 to form a hollow portion 23 configured to accommodate the fixing member 3. The first shielding member 21 further includes a fourth bulge 212. The fourth bulge 212 and the first bulge 211 are spaced apart. The fourth bulge 212 fits snugly with the second bulge 222 to increase the strength of the shielding member 2.

Figure 6:
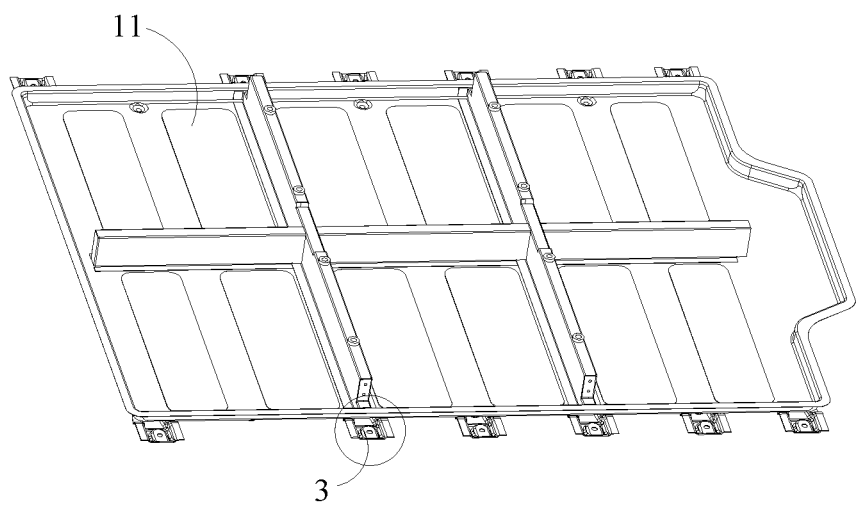
FIG. 6 is a schematic structural diagram of a frame member of a box according to an embodiment of this application.
Figure 7:
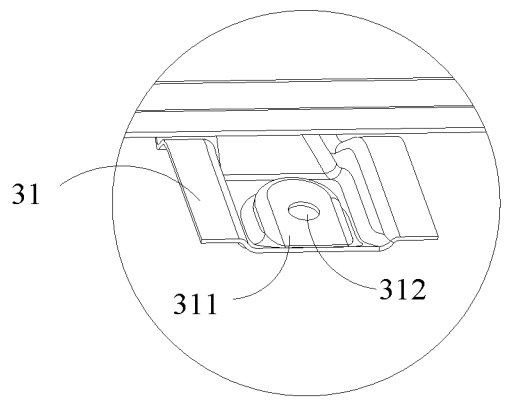
FIG. 7 is a local detailed view of a part of FIG. 6.

FIG. 6 is a schematic structural diagram of a frame member 1 of a box M according to an embodiment of this application, and FIG. 7 is a local detailed view of a part of FIG. 6. As shown in FIG. 6 and FIG. 7, the fixing member 3 includes a hitch portion 31 configured to fix the box M. The hitch portion 31 is accommodated in the hollow portion 23. The hitch portion 31 is configured to hitch the box M onto the vehicle. The hitch portion 31 is accommodated in the hollow portion 23. When a squeezing force is generated in a lateral collision, the hollow portion 23 can serve a cushioning function and avoid direct collision with the hitch portion 31, thereby improving the capability of the battery pack P to resist the squeezing force in a lateral collision.

Specifically, the hitch portion 31 includes a third bulge 311. The third bulge 311 is disposed to protrude toward the first shielding member 21. A gap exists between the third bulge 311 and the first shielding member 21. The reserved gap is configured to install a bushing. The third bulge 311 can increase the strength of the hitch portion 31. A protrusion direction of the third bulge 311 is consistent with a protrusion direction of the first bulge 211, thereby leaving more space for the shielding member 2.

Further, the top or bottom of the hitch portion 31 fits snugly with the shielding member 2 to serve a function of supporting the hollow portion 23. Alternatively, both the top and bottom of the hitch portion 31 fit snugly with the shielding member 2. The hitch portion 31 is located in the hollow portion 23. Therefore, the hitch portion 31 and the shielding member 2 fit snugly together to serve a function of supporting the hollow portion 23, and increase the strength of the shielding member 2.

The hitch portion 31 is designed as a bent structure to further increase the strength of the hitch portion 31.

As shown in FIG. 7 to FIG. 9, a first through hole 211a is disposed in the first bulge 211, a second through hole 223 is disposed in the second shielding member 22, and a third through hole 312 is disposed in the third bulge 311. The first through hole 211a, the second through hole 223, and the third through hole 312 are disposed correspondingly and configured to allow passing of a bolt and hitch the battery pack P onto the vehicle.

In some embodiments, as can be seen from FIG. 4 to FIG. 6, the fixing member 3 is connected onto a periphery of the frame member 1.

The fixing member 3 is connected onto the periphery of the frame member 1. The shielding member 2 is configured to be connected to the frame member 1. The hollow portion contained in the shielding member 2 accommodates at least a part of the fixing member 3. In this way, both the fixing member 3 and the shielding member 2 are connected to the periphery of the frame member 1. Therefore, even if a vehicle is squeezed in a lateral collision, the shielding member 2 is squeezed first, and the shielding member 2 withstands a squeezing force. In addition, the hollow portion 23 disposed in the shielding member 2 serves functions of absorbing and cushioning the squeezing force in the lateral collision, thereby increasing the capability of resisting the squeezing force in the lateral collision and effectively safeguarding the performance and soundness of the battery pack P.

Although this application has been described with reference to exemplary embodiments, various improvements may be made to the embodiments without departing from the scope of this application, and the components therein may be replaced with equivalents. Particularly, to the extent that no structural conflict exists, various technical features mentioned in various embodiments can be combined in any manner. This application is not limited to the specific embodiments disclosed herein, but includes all technical solutions falling within the scope of the claims.

What is claimed is:

1. A box for a battery pack, comprising:
   a frame member, configured to form an accommodation cavity which is configured to accommodate a battery;
   a fixing member, configured to mount the box, wherein the fixing member is connected to a periphery of the frame member; and
   a shielding member, configured to be connected to the frame member, wherein the shielding member comprises a hollow portion, and at least a part of the fixing member is accommodated in the hollow portion; and
   the shielding member comprises a first shielding member and a second shielding member, and the first shielding member and the second shielding member are connected to each other to form the hollow portion, wherein
   along a height direction of the box, a reinforcing plate is disposed at the bottom of the frame member, and the fixing member is a structure formed by extending the reinforcing plate along a width direction of the box.

2. The box according to claim 1, wherein the first shielding member comprises a first bulge, the first bulge is disposed to protrude away from the second shielding member, and the first bulge and a corresponding part of the second shielding member form the hollow portion.

3. The box according to claim 1, wherein the second shielding member comprises a second bulge, and the second bulge is disposed to protrude toward the first shielding member.

4. The box according to claim 3, wherein the second bulge fits snugly with the first shielding member.

5. The box according to claim 1, wherein the fixing member comprises a hitch portion configured to fix the box, and the hitch portion is accommodated in the hollow portion.

6. The box according to claim 5, wherein a top of the hitch portion fits snugly with the shielding member; and/or
   a bottom of the hitch portion fits snugly with the shielding member.

7. The box according to claim 5, wherein the hitch portion comprises a third bulge, the third bulge is disposed to protrude toward the first shielding member, and a gap exists between the third bulge and the first shielding member.

8. A battery pack, comprising: the box according to claim 1; and
   a battery accommodated in the accommodation cavity of the box.

9. A device, comprising the battery pack according to claim 8, wherein the battery pack is configured to provide electrical energy.

10. The box according to claim 1, wherein along the height direction of the box, the first shielding member and the second shielding member are arranged from top downward to form the hollow portion configured to accommodate the fixing member.

11. The box according to claim 1, wherein the first shielding member comprises a first connecting piece, and the second shielding member comprises a second connecting piece, the first connecting piece is connected to the second connecting piece to form the shielding member, and the first connecting piece and the second connecting piece are fixedly connected to the frame member separately to fix the first shielding member and the second shielding member onto the box respectively.

12. The box according to claim 3, wherein the second bulge comprises a main body and an extension portion, the main body and the extension portion are connected in communication with each other, the main body extends along a length direction of the box, and the extension portion extends along the width direction of the box.

13. The box according to claim 2, wherein the first shielding member further comprises a fourth bulge, the fourth bulge and the first bulge are spaced apart, and the fourth bulge fits snugly with the second bulge.

14. The box according to claim 2, wherein the fixing member comprises a hitch portion configured to fix the box, the hitch portion is accommodated in the hollow portion,
   the hitch portion comprises a third bulge, the third bulge is disposed to protrude toward the first shielding member, a gap exists between the third bulge and the first shielding member,
   a first through hole is disposed in the first bulge, a second through hole is disposed in the second shielding member, a third through hole is disposed in the third bulge, and the first through hole, the second through hole, and the third through hole are disposed correspondingly and configured to allow passing of a bolt.

* * * * *